United States Patent
Lee et al.

(10) Patent No.: US 11,297,543 B2
(45) Date of Patent: *Apr. 5, 2022

(54) METHOD AND APPARATUS FOR MANAGING SESSION TO CHANGE A USER PLANE FUNCTION IN A WIRELESS COMMUNICATION SYSTEM

(71) Applicant: Samsung Electronics Co., Ltd., Suwon-si (KR)

(72) Inventors: Jicheol Lee, Suwon-si (KR); Jinsung Lee, Suwon-si (KR); Jungshin Park, Seoul (KR); Beomsik Bae, Suwon-si (KR); Kisuk Kweon, Suwon-si (KR); Sangjun Moon, Seoul (KR); Hyungho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

This patent is subject to a terminal disclaimer.

(21) Appl. No.: 16/917,573

(22) Filed: Jun. 30, 2020

(65) Prior Publication Data
US 2020/0336949 A1    Oct. 22, 2020

Related U.S. Application Data

(63) Continuation of application No. 16/571,736, filed on Sep. 16, 2019, now Pat. No. 10,939,332, which is a (Continued)

(30) Foreign Application Priority Data

Mar. 20, 2017   (KR) .................. 10-2017-0034666

(51) Int. Cl.
*H04W 36/00*   (2009.01)
*H04L 12/46*   (2006.01)
(Continued)

(52) U.S. Cl.
CPC ..... *H04W 36/0022* (2013.01); *H04L 12/4633* (2013.01); *H04W 36/0011* (2013.01);
(Continued)

(58) Field of Classification Search
CPC ......... H04W 36/0022; H04W 36/0011; H04W 36/14; H04L 12/4633
See application file for complete search history.

(56) References Cited

U.S. PATENT DOCUMENTS 10,419,980 B2 *  9/2019  Lee .................... H04L 12/4633
2006/0099949 A1  5/2006  Jung et al.
(Continued)

FOREIGN PATENT DOCUMENTS

EP    3 508 004 A1    7/2019
KR    10-0680749 B1   2/2007
(Continued)

OTHER PUBLICATIONS

"Next Generation Protocols: Evolved Architecture for mobility using Identity Oriented Networks", ETSI Draft Specification, NGP 004, European Telecommunications Standards Institute, Feb. 12, 2017, 26 pages.
(Continued)

*Primary Examiner* — Siming Liu

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure further relates to a method
(Continued)

by a session management function (SMF) in a network including a session that is established via a first user plane function (UPF). The method includes determining whether to change the first UPF to a second UPF, and transmitting, to a terminal via an access and mobility function (AMF), a first message including a maintain time of the session established via the first UPF, when the first UPF needs to be changed.

30 Claims, 17 Drawing Sheets

Related U.S. Application Data continuation of application No. 15/925,708, filed on Mar. 19, 2018, now Pat. No. 10,419,980.

(51) Int. Cl.
    *H04W 84/04*       (2009.01)
    *H04W 80/04*       (2009.01)
    *H04W 36/14*       (2009.01)
(52) U.S. Cl.
    CPC .......... *H04W 36/14* (2013.01); *H04W 80/045* (2013.01); *H04W 84/042* (2013.01)

(56) References Cited

U.S. PATENT DOCUMENTS

| | | | |
|---|---|---|---|
| 2008/0032695 | A1 | 2/2008 | Zhu et al. |
| 2011/0064047 | A1 | 3/2011 | Nieminen |
| 2012/0276913 | A1 | 11/2012 | Lim et al. |
| 2014/0119340 | A1 | 5/2014 | Stojanovski et al. |
| 2014/0301364 | A1 | 10/2014 | Xu et al. |
| 2015/0065035 | A1 | 3/2015 | Kim et al. |
| 2015/0106454 | A1 | 4/2015 | Lim et al. |
| 2015/0237532 | A1 | 8/2015 | Zhang |
| 2015/0256440 | A1 | 9/2015 | Jeong et al. |
| 2017/0094577 | A1 | 3/2017 | Kim et al. |
| 2018/0103368 | A1 | 4/2018 | Son et al. |
| 2018/0198867 | A1 | 7/2018 | Dao et al. |
| 2018/0199398 | A1 | 7/2018 | Dao et al. |
| 2018/0270715 | A1 | 9/2018 | Lee et al. |
| 2018/0270782 | A1 | 9/2018 | Park et al. |
| 2019/0116483 | A1 | 4/2019 | Ryu et al. |

FOREIGN PATENT DOCUMENTS

| | | |
|---|---|---|
| KR | 10-2014-0038846 A | 3/2014 |
| KR | 10-2015-0026652 A | 3/2015 |
| KR | 10-1690718 B1 | 12/2016 |
| KR | 10-2017-0036551 A | 4/2017 |
| KR | 10-2018-0038716 A | 4/2018 |
| KR | 10-2018-0106400 A | 10/2018 |
| KR | 10-2018-0106804 A | 10/2018 |
| KR | 10-2018-0123141 A | 11/2018 |
| KR | 10-2201775 B1 | 1/2021 |

OTHER PUBLICATIONS

Supplementary Partial European Search Report dated Jul. 7, 2020 in connection with European Patent Application No. 18 77 2169, 11 pages.
"3rd Generation Partnership Project; Technical Specification Group Services and System Aspects; Study on Architecture for Next Generation System (Release 14)", 3GPP TR 23.799 V14.0.0 (Dec. 2016), Dec. 16, 2016, 522 pages.
International Search Report dated Aug. 22, 2018 in connection with International Patent Application No. PCT/KR2018/003195, 4 pages.
Decision of Patent dated Jul. 30, 2021, in connection with Korean Application No. 10-2017-0034666, 7 pages.
Office Action dated Aug. 19, 2021, in connection with Korean Application No. 10-2021-0104627, 8 pages.
3GPP TS 23.502 V2.0.0 (Dec. 2017), Technical Specification, 3rd Generation Partnership Project; Technical Specification Group Services and System Aspects; Procedures for the 5G System; Stage 2 (Release 15), Dec. 2017, 260 pages.
Korean Intellectual Property Office, "Decision of Patent" dated Feb. 8, 2022, in connection with counterpart Korean Patent Application No. 10-2021-0104627, 4 pages.
3GPP TS 23.502 V0.2 0 (Feb. 2017) Technical Specification; 3rd Generation Partnership Project; Technical Specification Group Services and System Aspects; Procedures for the 5G System; Stage 2 (Release 15), 71 pages.

\* cited by examiner

METHOD AND APPARATUS FOR MANAGING SESSION TO CHANGE A USER PLANE FUNCTION IN A WIRELESS COMMUNICATION SYSTEM

CROSS-REFERENCE TO RELATED APPLICATIONS

This application is a continuation of U.S. patent application Ser. No. 16/571,736 filed on Sep. 16, 2019, which is a continuation of U.S. patent application Ser. No. 15/925,708 filed on Mar. 19, 2018, which is based on and claims priority under 35 U.S.C. § 119 to Korean Patent Application No. 10-2017-0034666 filed on Mar. 20, 2017, in the Korean Intellectual Property Office, the disclosures of which are herein incorporated by reference in their entirety.

BACKGROUND

1. Field

Various embodiments of the present disclosure relate to a method for relocating an anchor user plane function (UPF) for a protocol data unit (PDU) session with a session and service continuity (SSC) mode 2 as an attribute according to determination by a network entity (session management function (SMF)) managing a session in a cellular wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The $3^{rd}$ generation partnership project (3GPP) in charge of a cellular mobile communication standard named a new core network architecture a 5G core (5GC) and has been conducting standardization for evolution from the conventional 4G LTE system to the 5G system.

The 5GC supports differentiated functions as follows from an evolved packet core (EPC) which is a network core for the conventional LTE. First, a network slice function is employed. As requirements for the 5G, the 5GC needs to support various types of terminals and services, for example, enhanced mobile broadband (eMBB), ultra reliable low latency communications (URLLC), and massive machine type communications (mMTC). The terminals/services each have different requirements for the core network. For example, the eMBB service will require high data rate, and the URLLC service will require high stability and low latency. Network slicing is a technology suggested to satisfy various requirements of the services. The network slicing is a method of virtualizing one physical network to make multiple logical networks, in which each network slice instance (NSI) may have different characteristics. This becomes possible as each NSI has a network function (NF) fitting characteristics thereof. Various 5G services may be efficiently supported by allocating an NSI fitting characteristics of a service required by each terminal. Second, it is easy to support a paradigm of network virtualization through separation of a mobility management function and a session management function. In the conventional 4G LTE, all terminals may be provided with services from a network through signaling exchange with a mobility management entity (MME) which is single core equipment in charge of registration, authentication, mobility management and session management functions. However, in 5G, in accordance with an explosive increase in the number of terminals, and subdivision of mobility and traffic/session characteristics to be supported according to a type of terminal, when single equipment such as the MME supports all functions, scalability for adding an entity for each function as needed cannot but deteriorate. Therefore, various functions have been developed based on a structure of separating the mobility management function and the session management function for improving scalability in terms of function/implementation complexity of core equipment in charge of the control plane and signaling loads. FIG. 1 shows a network architecture for the 5G system. An access and mobility management function (AMF) managing mobility of a terminal and network registration and a session management function (SMF) managing an end-to-end session are separated from each other, and may transmit and receive signaling to and from each other through an N11 interface. Third, a service and session continuity (SSC) mode is employed in order to support various requirements for continuity of applications or services of a terminal, and an SSC mode may be designated and used for each PDU session. There are three SSC modes. An SSC mode 1 is a mode in which an anchor UPF which is a communication contact point with an external data network (DN) is not relocated while a corresponding session is maintained, even when a terminal moves, and since an IP address (prefix) allocated to the corresponding session is not changed, session continuity at the IP level may be secured. Whereas, SSC modes 2 and 3 allow the relocation of the anchor UPF described above. A difference between the SSC mode 2 and the SSC mode 3 is that in the SSC mode 2, when relocating the anchor UPF, connection with a new anchor UPF needs to be configured immediately after disconnecting connection with an existing anchor UPF, and in the SSC mode 3, the connection with the existing anchor UPF may be maintained while the connection with the new anchor UPF is configured. Therefore, in a session of the SSC mode 3, data transmission may be performed simultaneously through a plurality of anchor UPFs with respect to the same external data network (make-before-break type). However, in a session of the SSC mode 2, since a break-before-make scheme is used, overhead for signaling between entities and tunnel management is small in the core network, but when the anchor UPF is relocated at a point in time at which traffic of a terminal is transmitted, service interruption may occur.

SUMMARY

Embodiments of the present disclosure are directed to defining signaling required to minimize a service interruption time when performing anchor user plane function (UPF) relocation for a session of an SSC mode 2, and a procedure thereof. Another object of the present disclosure is directed to defining signaling required when performing anchor UPF relocation for a session of an SSC mode 3, and a procedure thereof.

Objects of the present disclosure are not limited to the above-mentioned objects. That is, other objects that are not mentioned may be obviously understood by those skilled in the art to which the present disclosure pertains from the following description.

In accordance with an aspect of the present disclosure, a method by a session management function (SMF) in a network including a session that is established via a first user plane function (UPF) is provided. The method includes determining whether to change the first UPF to a second UPF, and transmitting, to a terminal via an access and mobility function (AMF), a first message including a maintain time of the session established via the first UPF, when the first UPF needs to be changed.

The method may further include receiving, from the terminal via the AMF, a second message to establish a session using the second UPF, and performing a procedure for releasing the session that is established via the first UPF, when the maintain time of the session, established via the first UPF, has expired.

The first message includes protocol data unit (PDU) session identification (ID) of the session or an indicator to establish the session using the second UPF.

In accordance with an aspect of the present disclosure, a method by a session management function (SMF) in a network including a session that is established via a first user plane function (UPF) is provided. The method includes determining whether to change the first UPF to a second UPF, and transmitting, to a terminal, a first message including a first internet protocol (IP) prefix corresponding to the first UPF via the first UPF and a second message including a second IP prefix corresponding to the second UPF via the second UPF, when the first UPF needs to be changed.

A field of a valid lifetime of the first IP prefix is determined based on the maintain time of the session, and a field of a preferred lifetime of the first IP prefix is determined to 0.

The session includes session using an internet protocol version 6 (IPv6).

In accordance with another aspect of the present disclosure, a method by an access and mobility management function (AMF) in a network including a session that is established via a first user plane function (UPF) is provided. The method includes receiving, from a session management function (SMF), a first message including a maintain time of the session established via the first UPF, when the first UPF needs to be changed, and forwarding, to a terminal, the first message.

The first message includes protocol data unit (PDU) session identification (ID) of the session or an indicator to establish the session using the second UPF.

In accordance with another aspect of the present disclosure, a session management function (SMF) in a network including a session that is established via a first user plane function (UPF) is provided. The SMF includes a transceiver, and a controller coupled with the transceiver and configured to determine whether to change the first UPF to a second UPF, and control the transceiver to transmit, to a terminal via an access and mobility function (AMF), a first message including a maintain time of the session established via the first UPF, when the first UPF needs to be changed.

The controller may be configured to control the transceiver to receive, from the terminal via the AMF, a second message to establish a session using the second UPF, and perform a procedure for releasing the session that is established via the first UPF, when the maintain time of the session, established via the first UPF, has expired.

The first message includes protocol data unit (PDU) session identification (ID) of the session or an indicator to establish the session using the second UPF.

In accordance with another aspect of the present disclosure, a session management function (SMF) in a network including a session that is established via a first user plane function (UPF) is provided. The SMF includes a transceiver, and a controller coupled with the transceiver and configured to determine whether to change the first UPF to a second UPF, and control the transceiver to transmit, to a terminal, a first message including a first internet protocol (IP) prefix corresponding to the first UPF via the first UPF and a second message including a second IP prefix corresponding to the second UPF via the second UPF, when the first UPF needs to be changed.

A field of a valid lifetime of the first IP prefix is determined based on the maintain time of the session, and a field of a preferred lifetime of the first IP prefix is determined to 0.

In accordance with another aspect of the present disclosure, An access and mobility management function (AMF) in a network including a session that is established via a first user plane function (UPF) is provided. The AMF includes a transceiver, and a controller coupled with the transceiver and configured to control the transceiver to receive, from a session management function (SMF), a first message including a maintain time of the session established via the first UPF, when the first UPF needs to be changed, and control the transceiver to forward, to a terminal, the first message.

In accordance with another aspect of the present disclosure, a terminal in a network including a session that is established via a first user plane function (UPF) is provided. The terminal includes a transceiver, and a controller coupled with the transceiver and configured to control the transceiver to receive, from a session management function (SMF) via an access and mobility management function (AMF), a first message including a maintain time of the session established via the first UPF, when the first UPF needs to be changed, decide to initiate a procedure to establish a session using the second UPF, and control the transceiver to transmit, to the AMF, a second message including protocol data unit (PDU) session identification (ID) of a session, established via the second UPF.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
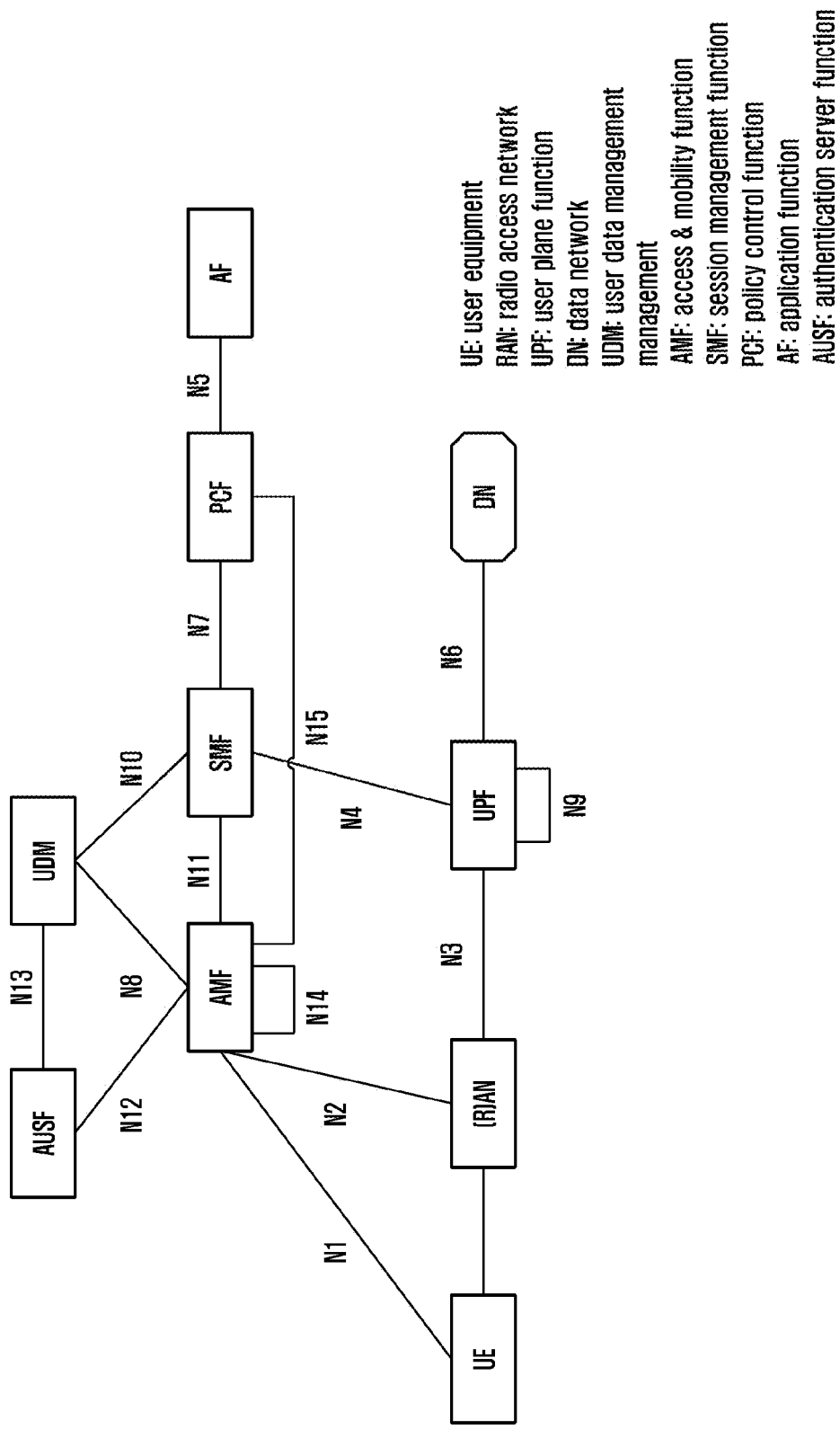
FIG. 1 is a diagram illustrating a network architecture and an interface for a 5G system.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure will be described in detail with reference to the accompanying drawings. In explaining the present disclosure, when it is determined that the detailed description for the known feature or configuration may unnecessarily obscure the gist of the present disclosure, the detailed description therefor will be omitted. Further, the following terminologies are defined in consideration of the functions in the present disclosure and may be construed in different ways according to users, an intention of operators, or conventions. Therefore, the definitions thereof should be construed based on the contents throughout the specification.

Hereinafter, a base station, as a subject performing resource allocation for a terminal, may be at least one of an evolved Node B (eNode B), a Node B, a BS, a radio access network (RAN), an access network (AN), a radio access unit, a base station controller, and a node on a network. A terminal may include user equipment (UE), a mobile station (MS), a cellular phone, a smartphone, a computer, or a multimedia system capable of performing a communication function. In the present disclosure, a downlink (DL) means a wireless transmission path of a signal transmitted by a base station to a terminal, and an uplink (UL) means a wireless transmission path of a signal transmitted by a terminal to a base station. Further, hereinafter, embodiments of the present disclosure will be described with the LTE or LTE-A system by way of example, but the embodiments of the present disclosure may also be applied to other communication systems having similar technical background or channel type. Further, the embodiments of the present disclosure may also be applied to other communication systems through some modification without departing from the scope of the present disclosure based on determination by a person skilled in the art.

The present disclosure defines a signaling message to be transmitted to another network entity when a session management function (SMF) which is an entity in charge of protocol data unit (PDU) session management (all the matters related to setup, change, and release of the session) determines to perform anchor user plane function (UPF) relocation for a session of a service and session continuity (SSC) mode 2 in cellular core networks, and provide a method for performing an anchor UPF relocation procedure using the signaling message.

Specifically, a factor for determining, by the SMF, to perform the anchor UPF relocation for the session of the SSC mode 2 may include a change in location of a terminal by movement of the terminal, or a case in which the SMF autonomously determines to perform the anchor UPF relocation for the session or the SMF receives a request for the anchor UPF relocation for the session from other network entities (e.g., application function (AF)). When the SMF determines to perform the anchor UPF relocation procedure based on the factor, the SMF may transfer the following new message to other network entities through signaling. The SMF transmits a PDU session release message for a PDU session for which the anchor UPF relocation is determined to a user equipment (UE) together with a PDU session ID of the PDU session. At this time, the SMF transmits a PDU session re-establishment required message together therewith, such that the UE performs a procedure of setting up a session again with the same PDU session ID used for the existing PDU session immediately after releasing the corresponding PDU session, by receiving the message.

In addition, when it is determined that there is no change in quality of service (QoS) for a session when setting up the session with a new anchor UPF, the SMF may transmit to an (R)AN (including 3GPP RAN and non-3GPP AN) a reusable indicator without releasing a data radio bearer (DRB) used for data transmission. When the (R)AN receives the indicator from the SMF, a procedure of changing an N3 tunnel which is a data transmission channel with the UPF from the existing anchor UPF to the new anchor UPF while maintaining the DRB with the UE as it is may be performed. At this time, when the setting up of the session with the new anchor UPF is completed and a new IP address is allocated, the UE may update QoS flow mapping information (or QoS rule) with the UP address.

In addition, the SMF may transfer an indicator for making an access and mobility function (AMF) to maintain mapping (association) of a PDU session ID which is information managed to route a session management (SM) non access stratum (NAS) signaling message for a session that is already set up for each UE and an SMF ID in charge of the session while the anchor UPF relocation is performed for the session of the SSC mode 2. When the indicator is received from the SMF, the AMF maintains the mapping, and when an NAS message including a PDU session establishment request is received from the UE, the AMF may check a PDU session ID included in the NAS message and route the PDU session establishment request to an SMF that managed the PDU session that is just released.

In addition, when PDU session release and PDU session re-establishment are performed by different SMFs, the AMF determining SMF selection may transmit to the existing SMF managing the session of the SSC mode 2 an indicator indicating that the SMF is to be changed. The SMF receiving the indicator for the change of the SMF from the AMF checks whether or not anchor UPF relocation for the session of the SSC mode 2 is needed, and if needed, performs the anchor UPF relocation procedure. At this time, the SMF may transmit to the AMF an indicator for removing mapping of the session ID and the serving SMF ID managed by the AMF. Through this, when the UE transmits a PDU session establishment request message later, the AMF may route the session establishment request message to the newly selected SMF rather than the existing SMF, such that the remaining procedure of setting up the session is performed through the new SMF.

Hereinafter, main operations of the present disclosure will be described through specific embodiments.

Figure 2:
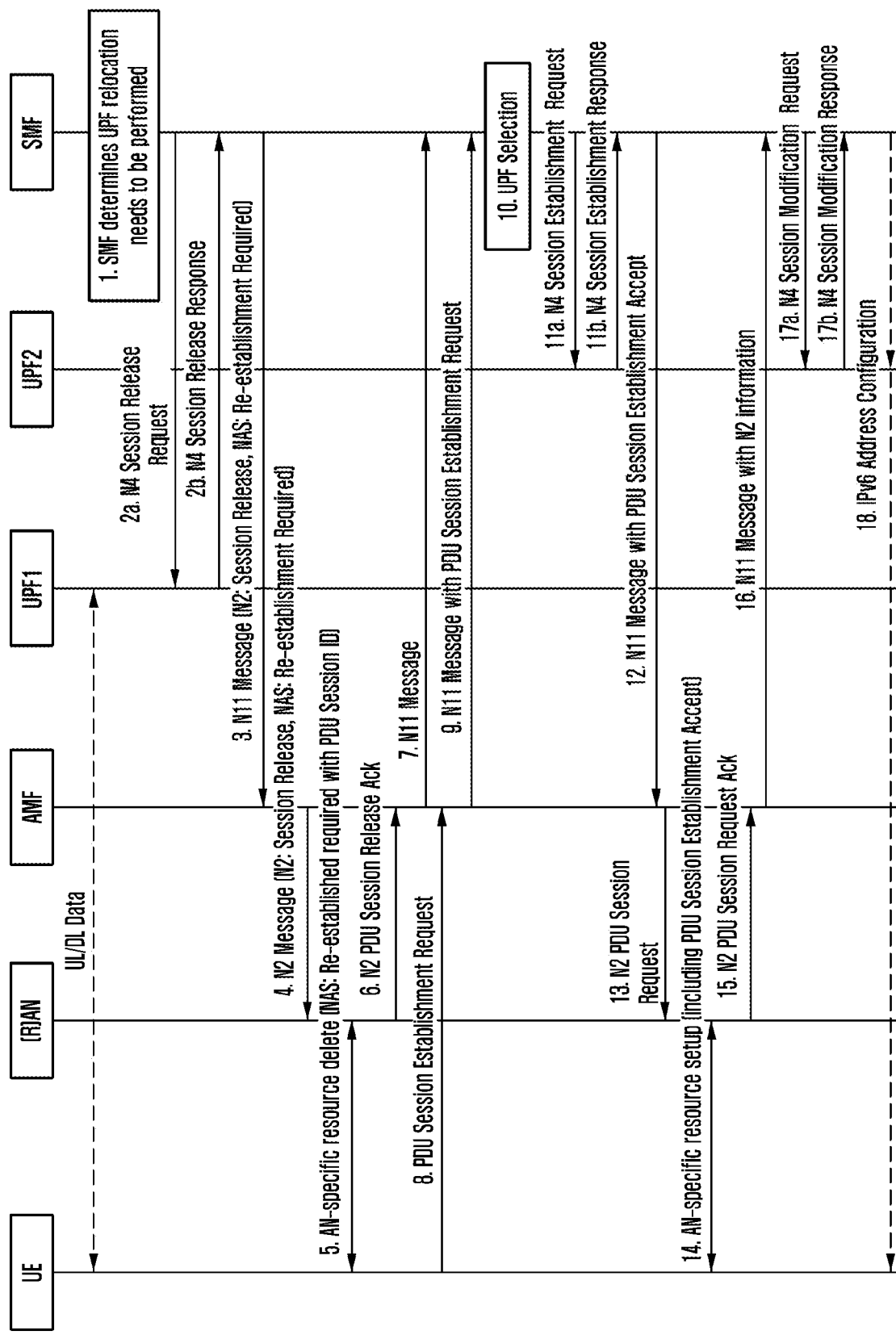
FIG. 2 is a diagram illustrating a procedure of relocating an anchor UPF by an SMF managing a PDU session of an SSC mode 2.

An embodiment describes a method for operating based on PDU session release and PDU session establishment procedures for anchor UPF relocation for a session of an SSC mode 2. Referring to FIG. 2, in step 1, an SMF managing the session of the SSC mode 2 determines to perform the anchor UPR relocation procedure when or it is determined that there is an advantage for a terminal or a network operator such as that a shorter data transmission path may be used or a time for which data reach is decreased when the anchor UPF currently being used by the corresponding session is changed. Step 2 includes a process of releasing a context of the session and the existing anchor UPF. This process includes recovering an allocated IP address (prefix) and releasing an UP connection resource (e.g., N3 tunnel) set up for the session. Step 3 includes transmitting, by the SMF, a signaling message for UPF relocation to an AMF. The signaling message may include an NAS message to be transmitted to an UE, an N2 message to be transmitted to an (R)AN, a PDU session ID to be transmitted to the AMF, and an indicator for maintaining mapping information of the PDU session ID and a serving SMF ID. The NAS message may include PDU session release and PDU session re-establishment required using PDU session ID. The N2 message may include PDU session release. In step 4, the AMF checks the PDU session ID from received N11 signaling, and determines whether to perform a subsequent operation by considering a connection management (CM) state indicating a signaling connection state of the UE. In a case in which the UE is in a CM-CONNECTED state, the subsequent procedure is immediately performed. Step 5 includes a process in which the (R)AN releases context of the session according to the signaling received in step 4, and transfers an NAS signaling message to the UE. Here, the UE receiving the NAS signaling message releases the context for the existing session, and immediately performs a PDU session establishment procedure by reusing the PDU session ID included in the NAS message. In step 6, the (R)AN transmits acknowledgement (ACK) for the PDU session release to the AMF, and step 7 includes a process of transferring the ACK message to the SMF. Steps 8 to 18 show a process in which the UE establishes a new PDU session. Step 8 includes a process in which the UE transfers an NAS signaling to the AMF for PDU session establishment using the PDU session ID. Step 9 shows a process of checking the PDU session ID from the received NAS message and routing the NAS message to the same SMF as the PDU session of the SSC mode 2. In step 10, the SMF may select a different UPF through UPF selection. This process may be omitted in the case in which the process is already performed in step 1 above. Step 11 includes a process for setting up a session with a newly selected UPF. Step 12 includes signaling for setting up a session with the (R)AN, when the setup of the session with the new UPF is completed. This signaling may include an NAS message to the UE and an N2 message to the (R)AN. The NAS message may include PDU session establishment accept and an IP address for the session in a case of IPv4 session type, and the N2 message may include information (e.g., tunneling ID) on the N3 tunnel set up for the UPF in step 11. Step 13 includes a process in which the AMF transfers an N2 message and an NAS message to the (R)AN, and the (R)AN sets up a tunnel for the UPF from the received N2 message. Step 14 includes a process in which the (R)AN performs DRB setup for the UE and the session, and transfers an NAS message to the UE. Step 15 includes a process in which the (R)AN transmits, to the AMF, ACK for the signaling performed in step 13, while including information on the N3 tunnel set up by the (R)AN in the ACK. In step 16, the AMF transfers the N3 tunnel information received from the (R)AN to the SMF, and in step 17, the SMF transfers the N3 tunnel information generated by the (R)AN to the newly selected anchor UPF, thereby finally completing the setup of the N3 tunnel for data transmission. Step 18 includes a process in which in a case of IPv6 PDU session type, the SMF generates a router advertisement message including information on a newly allocated IP prefix, and transfers the message to the UE by UP signaling through the relocated anchor UPF.

Figure 3:
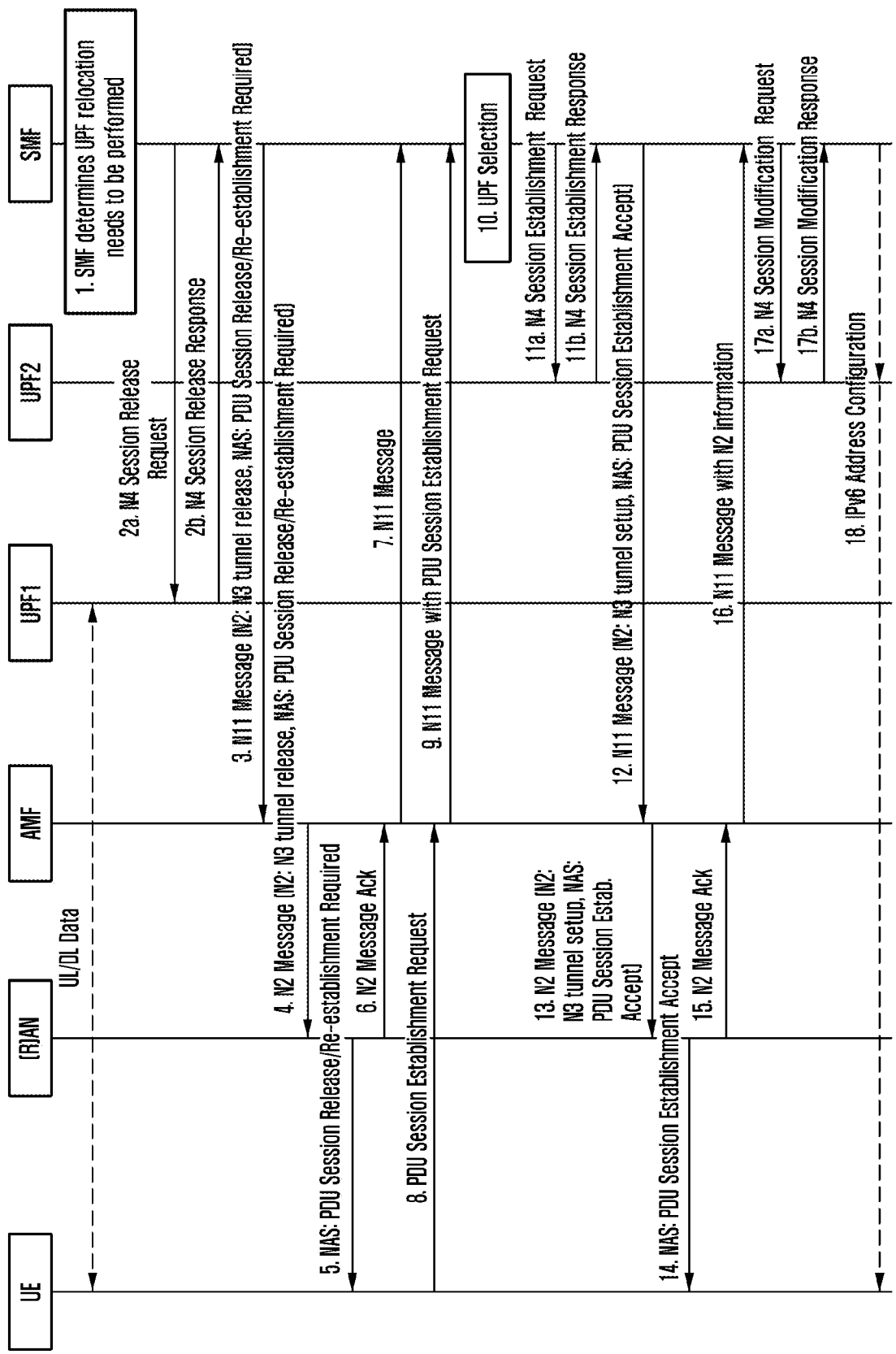
FIG. 3 is a diagram illustrating a procedure of relocating an anchor UPF by an SMF managing a PDU session of an SSC mode 2.

Another embodiment further includes a method of maintaining a DRB between an UE and an (R)AN corresponding to a PDU session when there is no change in QoS profile corresponding to the session by anchor UPF relocation. Referring to FIG. 3, in step 3, an SMF may include, in an N2 message to be transmitted to the (R)AN, signaling (i.e., N3 resource release request) instructing to release a resource related to an N3 tunnel. The signaling may be defined as a new message type or transferred between entities through a mutually agreed indicator. In step 4, an AMF forwards an N11 message received from the SMF to the (R)AN that the UE accesses, and the (R)AN receiving the N11 message does not perform an RRC signaling procedure like RRC connection reconfiguration with the UE for DRB release, but releases only the N3 tunnel resource of the session, in order to maintain the DRB corresponding to a PDU session ID transmitted together. In step 5, the (R)AN transfers to the UE an NAS message including PDU session release and re-establishment required message. Then, in a PDU session establishment process, when the SMF receives a PDU session establishment request message with the same PDU session ID from the UE (step 9), the SMF includes N3 tunnel setup request in an N2 message (step 12). In step 14, when receiving the N3 tunnel setup request, the (R)AN allocates a resource for the N3 tunnel of the PDU session, and performs mapping with the DRB maintained without being released in step 5. Further, when a new IP address is allocated, the UE updates a QoS rule of the PDU session with a new IP address. Steps not mentioned in the present embodiment follow the embodiment described in FIG. 2.

Figure 4:
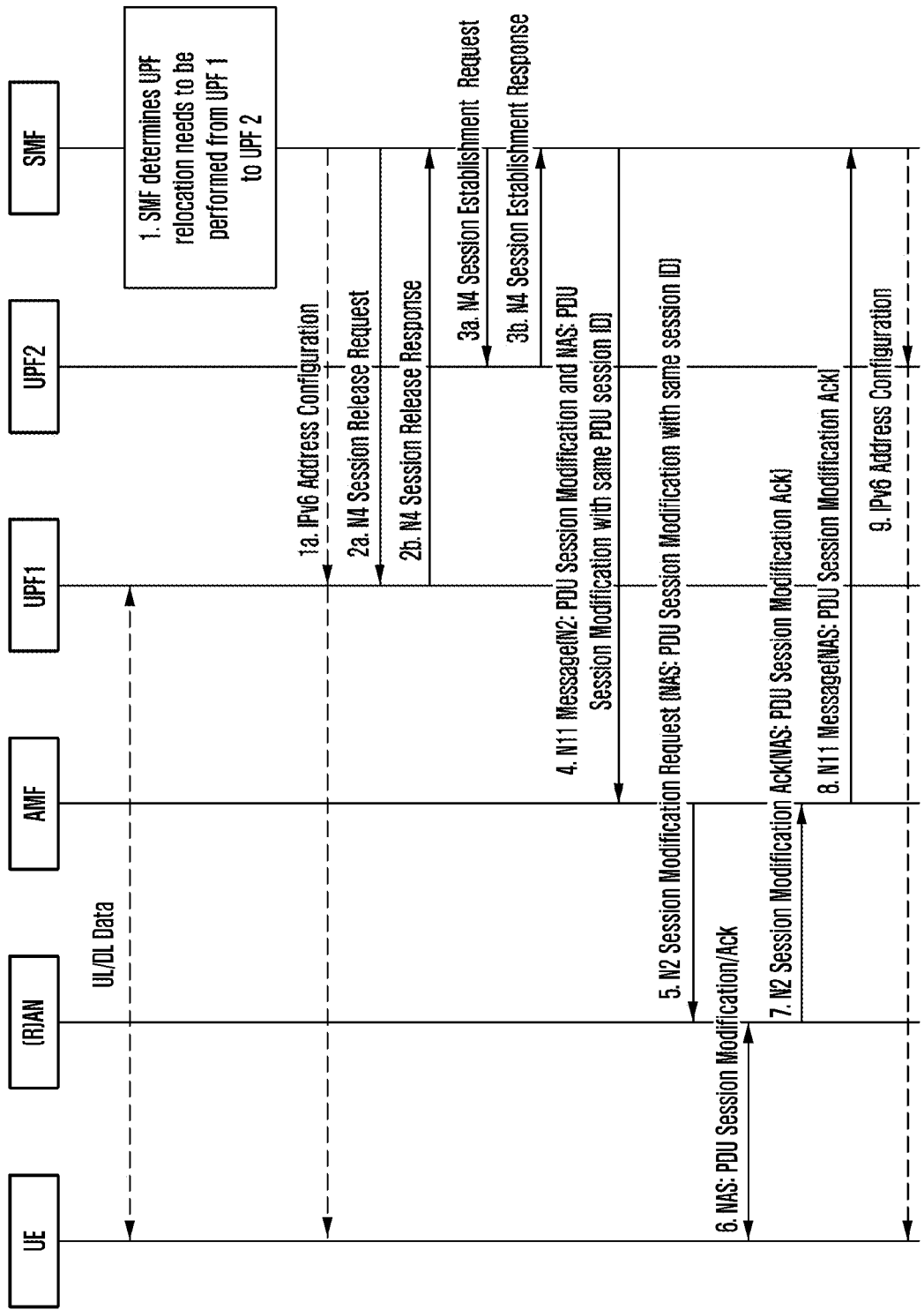
FIG. 4 is a diagram illustrating a procedure of relocating an anchor UPF by an SMF managing a PDU session of an SSC mode 2.

Another embodiment describes a method for operating based on a PDU session modification procedure for anchor UPF relocation for a session of an SSC mode 2. Referring to FIG. 4, in step 1, an SMF managing the PDU session determines that a data transmission path passing through an UPF2 which is a new anchor UPF, rather than an UPF1 which is an existing anchor UPF is more advantageous. At this time, the SMF also checks whether or not an existing IP address is reusable. When the IP address is not reusable, in the case of IPv6 session type, the SMF may additionally generate a router advertisement (RA) message to make an UE not to use the corresponding session. The RA message may include an already allocated IP prefix and be transmitted in a state in which a valid lifetime field is set to be 0. The UE receiving the RA message, immediately, may not use the corresponding IP prefix and may thus not use the PDU session. In step 2, the SMF performs context release related to the PDU session for the existing anchor UPF. Step 3 includes a process for setting up a session with the new anchor UPF determined in step 1. At this time, when it is determined that the IP address is reusable in step 1, the SMF configures to route the same IP address, when it is determined that the IP address is not reusable in step 1, the SMF configures so that the anchor UPF route a new IP address. Further, the SMF provides N3 tunnel information allocated by an (R)AN to the UPF, and the UPF transfers newly allocated tunnel information to the SMF for setting up the N3 tunnel. In step 4, the SMF generates NAS signaling to be transferred to the UE and N2 signaling to be transferred to the (R)AN and transfers the NAS signaling and the N2 signaling to an AMF. At this time, when the new IP address is used, the NAS signaling may include the IP address for the IPv4 session type. In step 5, the AMF forward the signaling transferred from the SMF to the (R)AN that the UE accesses. In step 6, the (R)AN changes the N3 tunnel by receiving the N3 tunnel information from the received N2 message. Further, the (R)AN transfers the NAS message received together to the UE. When the new IP address is transferred, the UE updates QoS mapping (or QoS rule) belonging to the PDU session with the new IP address. At this time, the UE may generate ACK for the received NAS message. Through steps 7 and 8, a PDU session modification ACK message by the (R)AN and the UE is transferred to the SMF. For the IPv6 session type, the SMF generates a router advertisement message including a new IP prefix and transfers the router advertisement message to the UE (step 9). The UE may receive mobile terminated (MT) data using the existing IP address for a longer period of time by delaying a point in time at which step 2 is performed. The present embodiment is described based on the PDU session modification procedure, but may also be defined as a new procedure, and in this case, a name of the signaling message may be changed.

Figure 5:
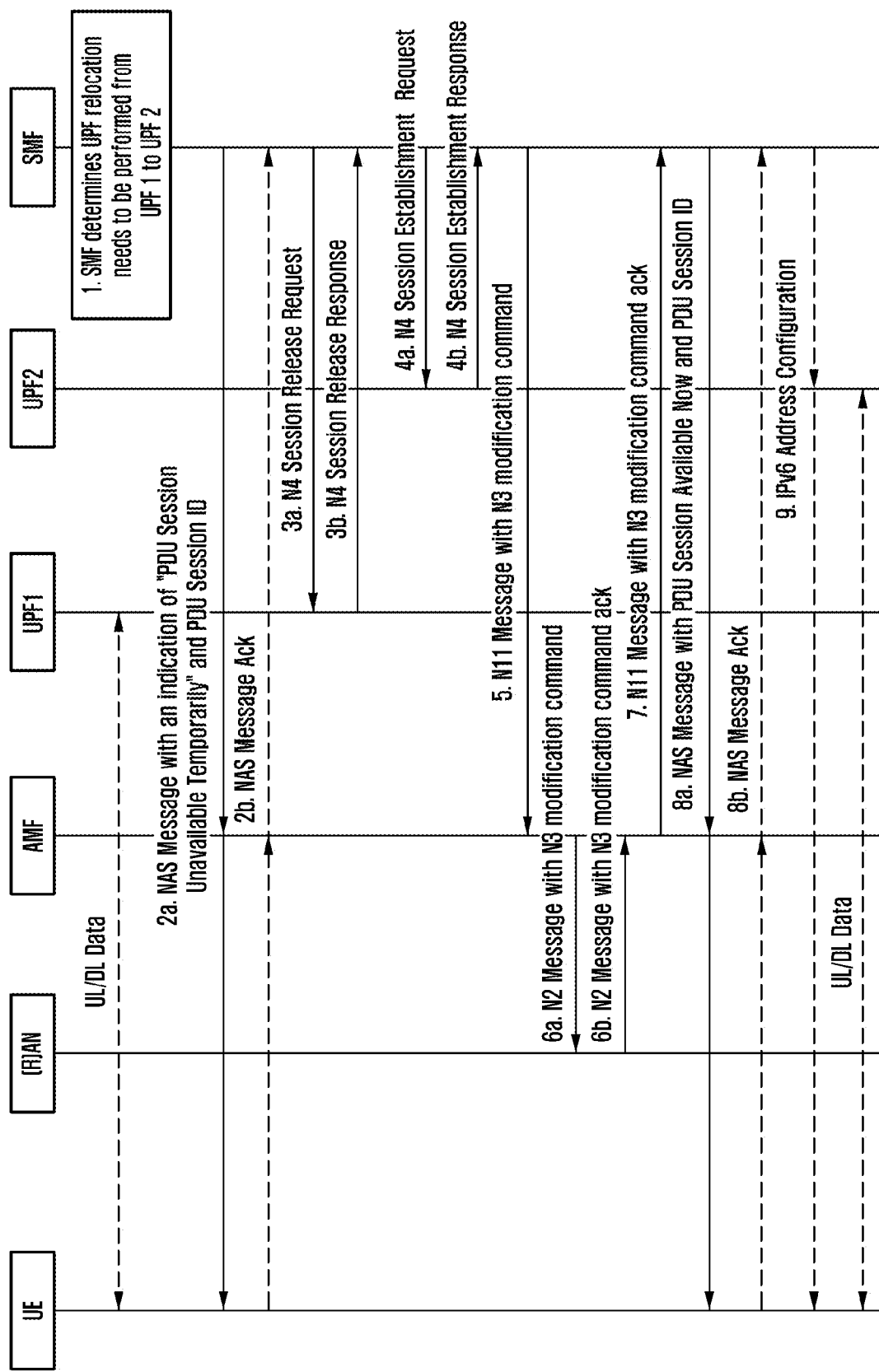
FIG. 5 is a diagram illustrating a procedure of relocating an anchor UPF by an SMF managing a PDU session of an SSC mode 2.

Another embodiment describes a new procedure for anchor UPF relocation for a session of an SSC mode 2. Referring to FIG. 5, in step 1, an SMF managing the PDU session determines that a data transmission path passing through an UPF2 which is a new anchor UPF, rather than an UPF1 which is an existing anchor UPF is more advantageous. At this time, the SMF also checks whether or not an existing IP address is reusable. The present embodiment corresponds to a case of allocating a new IP address. In step 2, the SMF transmits, to an UE through an NAS signaling message, an indicator called PDU session unavailable temporarily so that a session corresponding to a PDU session ID is temporarily unavailable. In the case of IPv6 session type, the NAS signaling may be transmitted through an IPv6 router advertisement message. At this time, the IPv6 router advertisement message may be transmitted in a state in which a valid lifetime value which is an option field of the router advertisement message is set to be 0. The UE receiving the NAS message may not transmit mobile originated (MO) traffic through the corresponding session until receiving an indicator called PDU session available now. The SMF releases a context of the PDU session allocated by the existing anchor UPF (step 3), and sets up a context of the PDU session with the new anchor UPF (step 4). Steps 2 and 3 may be performed in a different order. When setup of the session with the new anchor UPF is completed, the SMF transfers an N3 tunnel modification command message including N3 tunnel information to the (R)AN through an AMF (steps 5 and 6). When the N2 message is received, the (R)AN checks a PDU session ID and updates an N3 tunnel of the corresponding session, and transfers ACK therefor to the SMF (step 7). The SMF receiving the ACK recognizes that the anchor UPF relocation for the session of the SSC mode 2 is completed, and transmits to the UE an NAS signaling message including the PDU session ID and the PDU session available now indicator. The UE receiving the NAS message becomes a state in which data transmission and reception through the corresponding PDU session are available (step 8). Further, when a new IP address is transferred together, the UE updates QoS mapping (or QoS rule) belonging to the PDU session with the new IP address. In the case of IPv6 session type, the SMF may additionally transmit a router advertisement message including a new IP prefix to the UE (step 9).

Figure 6:
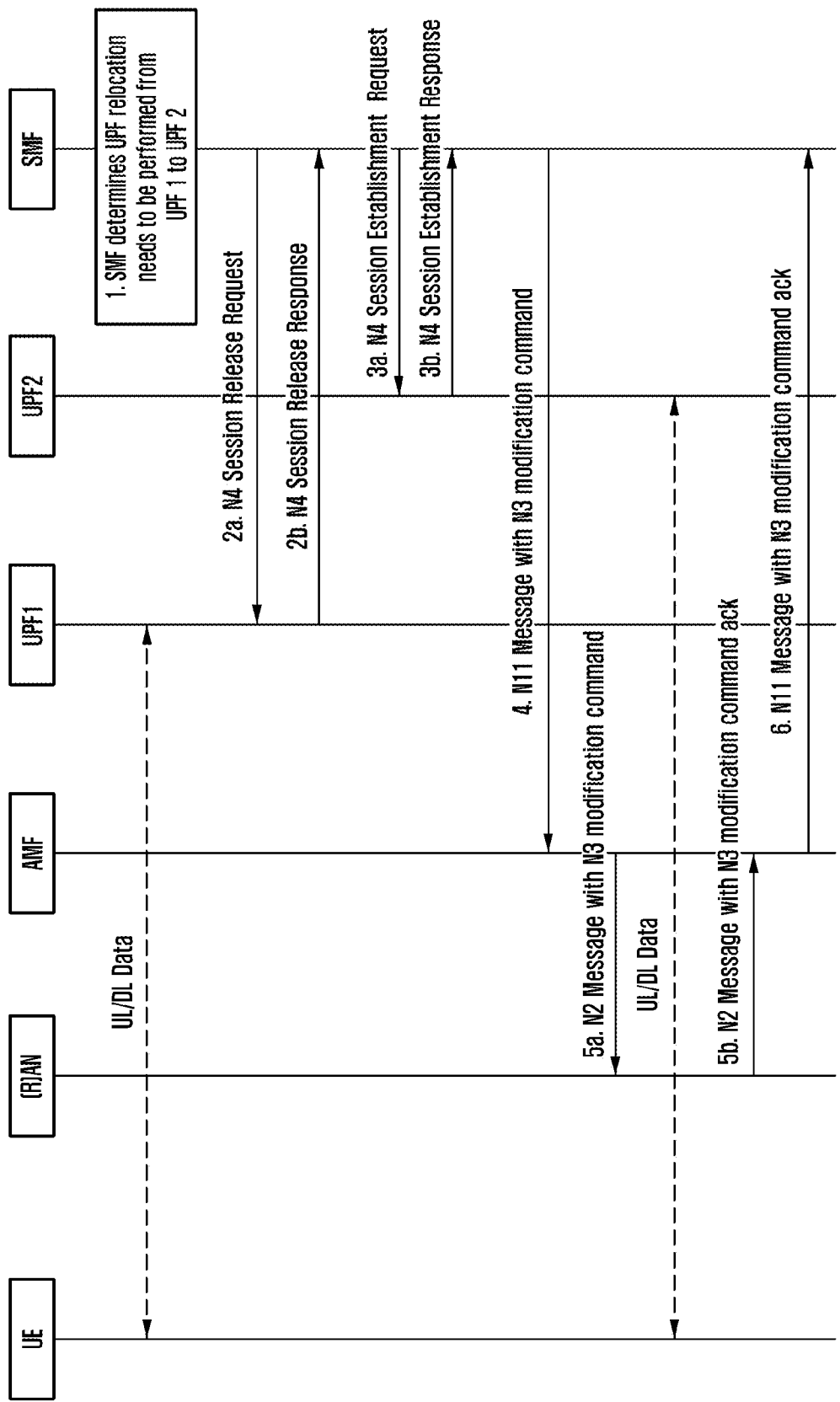
FIG. 6 is a diagram illustrating a procedure of relocating an anchor UPF by an SMF managing a PDU session of an SSC mode 2.

FIG. 6 illustrates a case in which an IP address is reusable in the new procedure described in the embodiment described in FIG. 5. Therefore, an NAS message transmitted by an SMF to an UE may not be included. Steps in FIG. 6 follow the method described in FIG. 5. According to the present embodiment, since the IP address is reusable, buffering may be performed when MT traffic for a corresponding session is generated in the existing anchor UPF or SMF until configuration of a data transmission path of the PDU session through a new anchor UPF is completed. In this case, a process in which the SMF instructs buffering for the corresponding session is included instead of step 2 described in FIG. 6.

Figure 7:
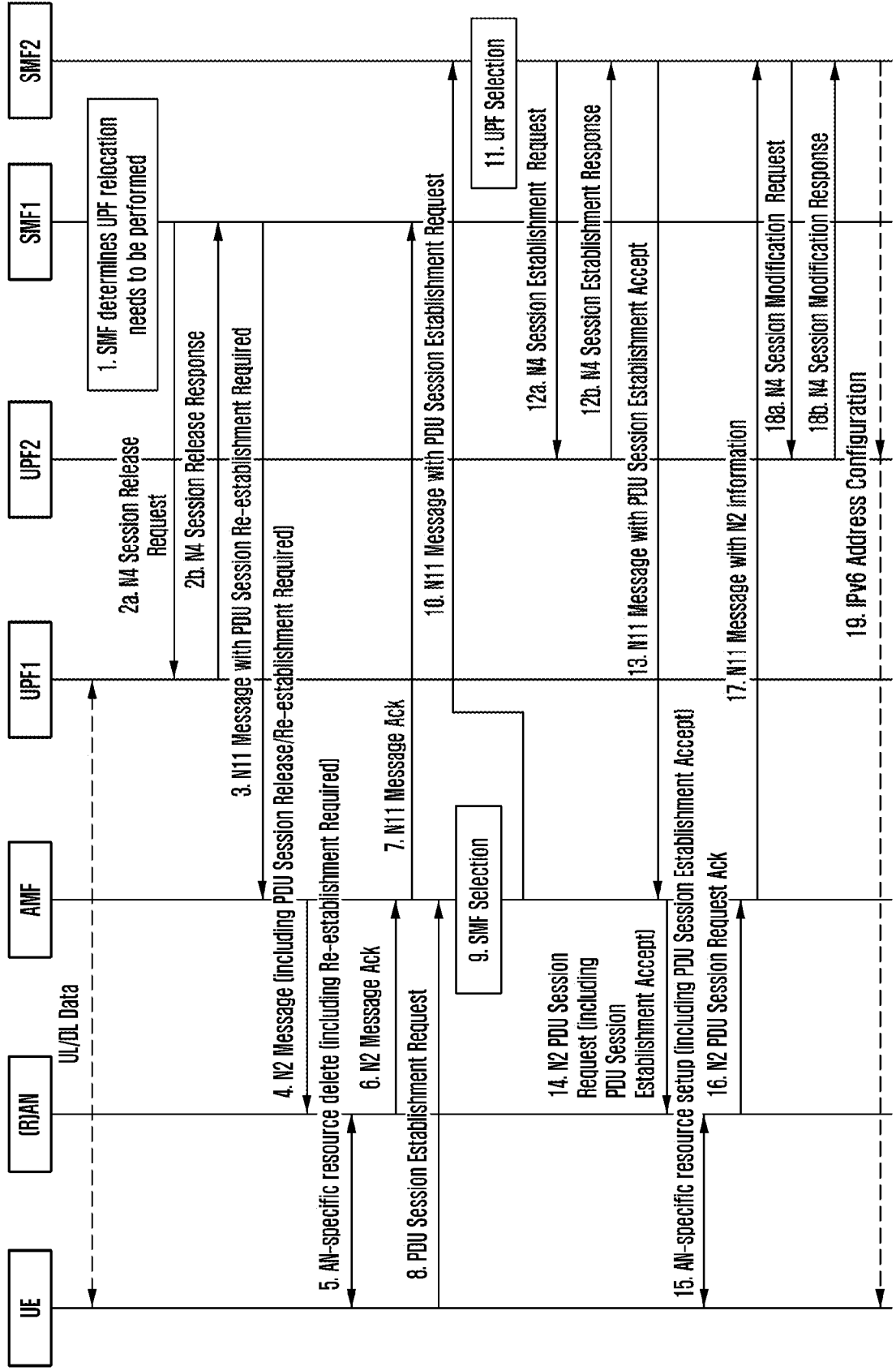
FIG. 7 is a diagram illustrating a procedure of relocating an anchor UPF by an SMF managing a PDU session of an SSC mode 2.

FIG. 7 illustrates a method for operating based on PDU session release and PDU session establishment procedures for anchor UPF relocation for a session of an SSC mode 2. Here, a case in which the PDU session release procedure and the PDU session establishment procedure are performed by different SMFs is included. Accordingly, a procedure of steps 2 to 7 is configured as a basic procedure of releasing a PDU session, and a procedure of steps 8 to 19 is configured as a basic procedure of newly setting up a PDU session. However, there are portions different from the basic procedure that in step 3, a PDU session release/re-establishment required indicator is included in an NAS message to be transmitted to an UE, and a PDU session release indicator is included in an N2 message to be transmitted to an (R)AN.

Figure 8:
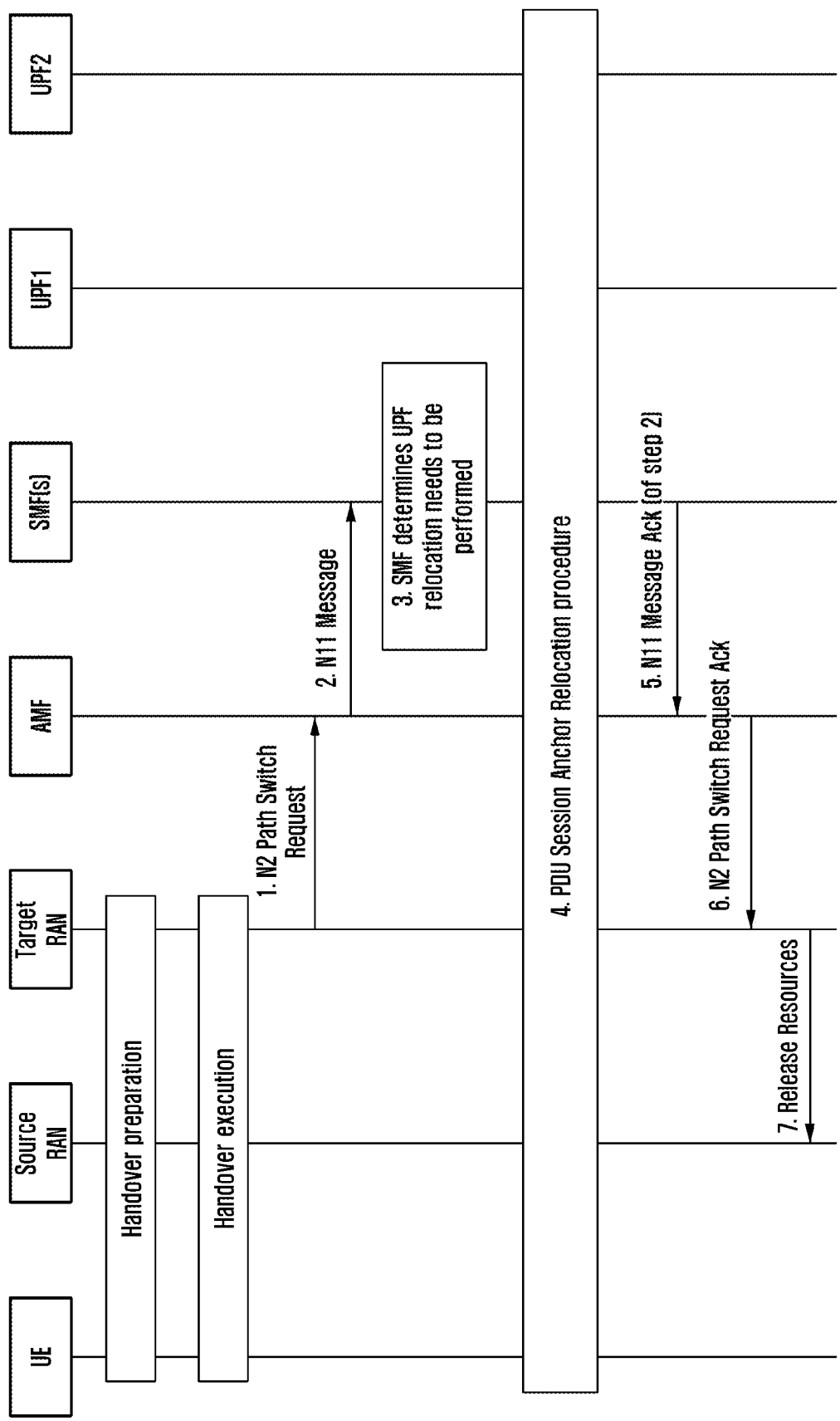
FIG. 8 is a diagram illustrating a procedure of relocating an anchor UPF by an SMF managing a PDU session of an SSC mode 2.

Another embodiment suggests a method in which anchor UPF relocation for a session of an SSC mode 2 is performed by handover caused by movement of an UE in a CM-CONNECTED state. Here, since an Xn interface for forwarding signaling and data exists between a source (R)AN and a target (R)AN, Xn-based handover occurs. Referring to FIG. 8, when a step of preparing and executing handover between base stations is completed, a target base station transmits N2 path switch request signaling to an AMF (step 1). The AMF transmits an N11 message including path switch request signaling to an SMF managing a session in which a data transmission path is set up based on mapping information of a PDU session ID and a serving SMF ID managed by the AMF (step 2). The N11 message may be transferred to a plurality of SMFs. When the SMF managing the session of the SSC mode 2 receives the N11 message, whether or not the anchor UPF relocation is required is checked, and when it is determined that the anchor UPF relocation needs to be performed, the anchor UPF relocation procedure is performed using the procedure according to the above-described embodiment (step 4). When the anchor UPF relocation procedure is completed, the SMF transmits, to the AMF, ACK for the message received in step 2 (step 5). When receiving the messages from all SMFs to which the AMF transmits the N11 message in step 2, the AMF transmits ACK for the path switch request to the target base station (step 6). The target base station transmits signaling for release of a UE context to a source base station.

Figure 9:
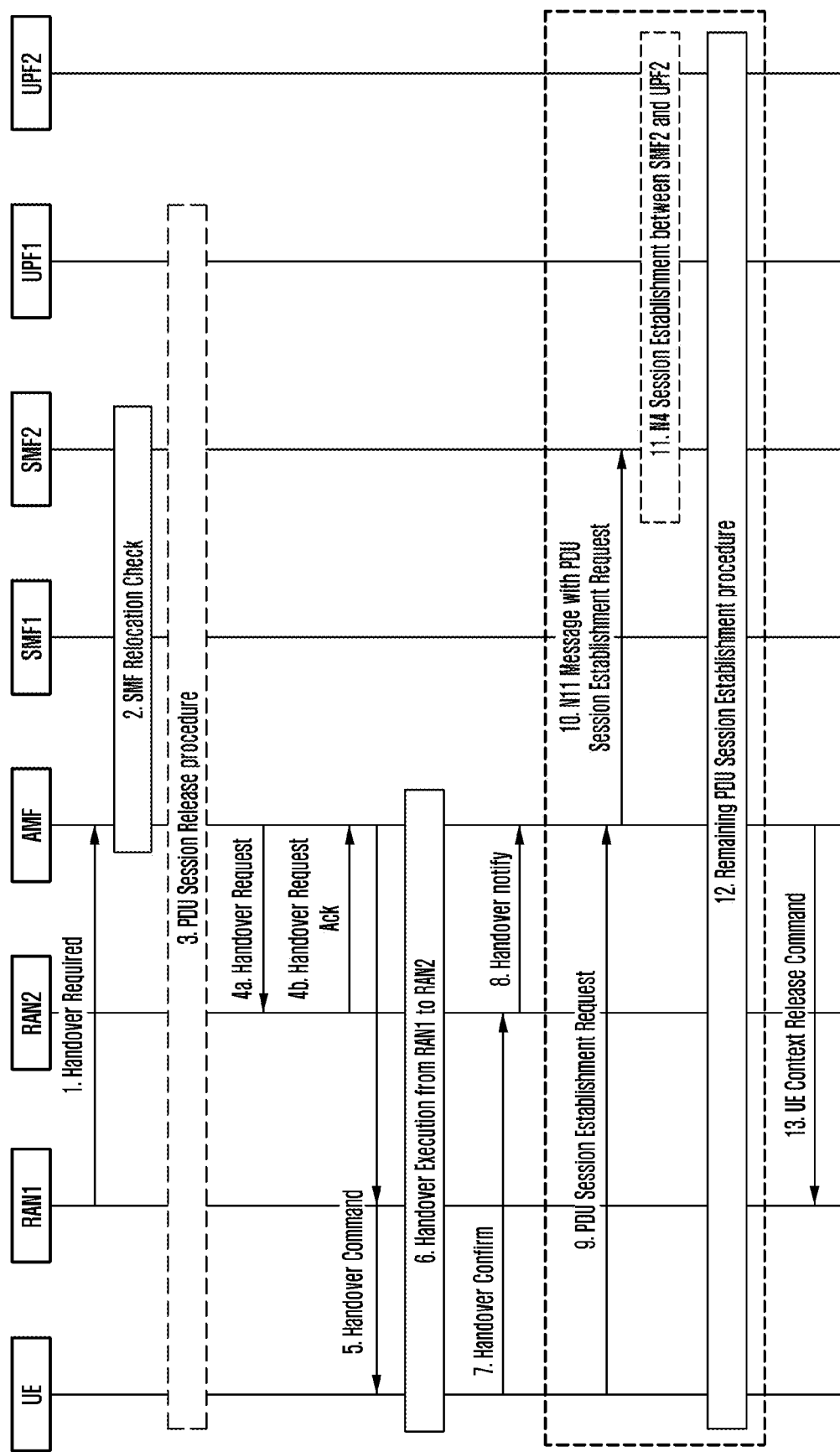
FIG. 9 is a diagram illustrating a procedure of relocating an anchor UPF by an SMF managing a PDU session of an SSC mode 2.

Another embodiment suggests a method in which anchor UPF relocation for a session of an SSC mode 2 is performed by handover caused by movement of an UE. Here, since the above-mentioned Xn interface does not exist between a source (R)AN and a target (R)AN, N2-based handover in which an AMF participates occurs. FIG. 9 illustrates a case in which an UE performs the N2-based handover from an RAN1 to an RAN2. In step 1, a source base station (RAN1) transmits a handover required message including information on a target base station (RAN2) to the AMF. At this time, UE location information in a tacking area (TA) unit may also be additionally provided. In step 2, when the terminal performs the handover to the target base station, the AMF checks whether or not the target base station is included in a service area of an SMF managing the session of the terminal. When it is determined that the target base station is out of the service area of the SMF, a procedure of selecting a new SMF is performed. Here, the AMF transmits together to an SMF1 which is an existing SMF an indicator indicating that reselection of an SMF is required, such that the SMF managing the session of the SSC mode 2 checks whether or not the UPF relocation needs to be additionally performed. Step 3 is a procedure in which the existing SMF (SMF1) managing the session of the SSC mode 2 determines that the UPF relocation needs to be performed when the indication for the reselection of the SMF is received, and thus performs PDU session release. At this time, the SMF may include an PDU session release and re-establishment required indicator and corresponding PDU session ID information in an NAS message. Further, the SMF may transmit together to the AMF an indicator for removing mapping of the PDU session ID and a serving SMF ID. In steps 4 and 5, as a procedure for executing the handover, the NAS message in step 3 may be transferred to the UE together with a handover command message in step 5. After the UE successfully executes the handover to the target base station (step 7), the UE performs a procedure of newly setting up a PDU session corresponding to the PDU session re-establishment required message (steps 9 to 12). The UE starts PDU session establishment procedure using the PDU session ID. In step 10, since there is no mapping of the PDU session ID and the serving SMF ID, the AMF forwards a PDU session establishment message to the SMF2 reselected in the handover process. Then, the setup procedure of the session of the SSC mode 2 may be performed in the same manner as mentioned in the above embodiment. When the setup procedure of the session of the SSC mode 2 is completed, the AMF transmits signaling for removing a UE context from the source base station. Although the present embodiment describes N2 handover in a case in which a session of the SSC mode 2 exists, but the present embodiment may also be applied to a case in which a session of a different SSC mode is included.

Figure 10:
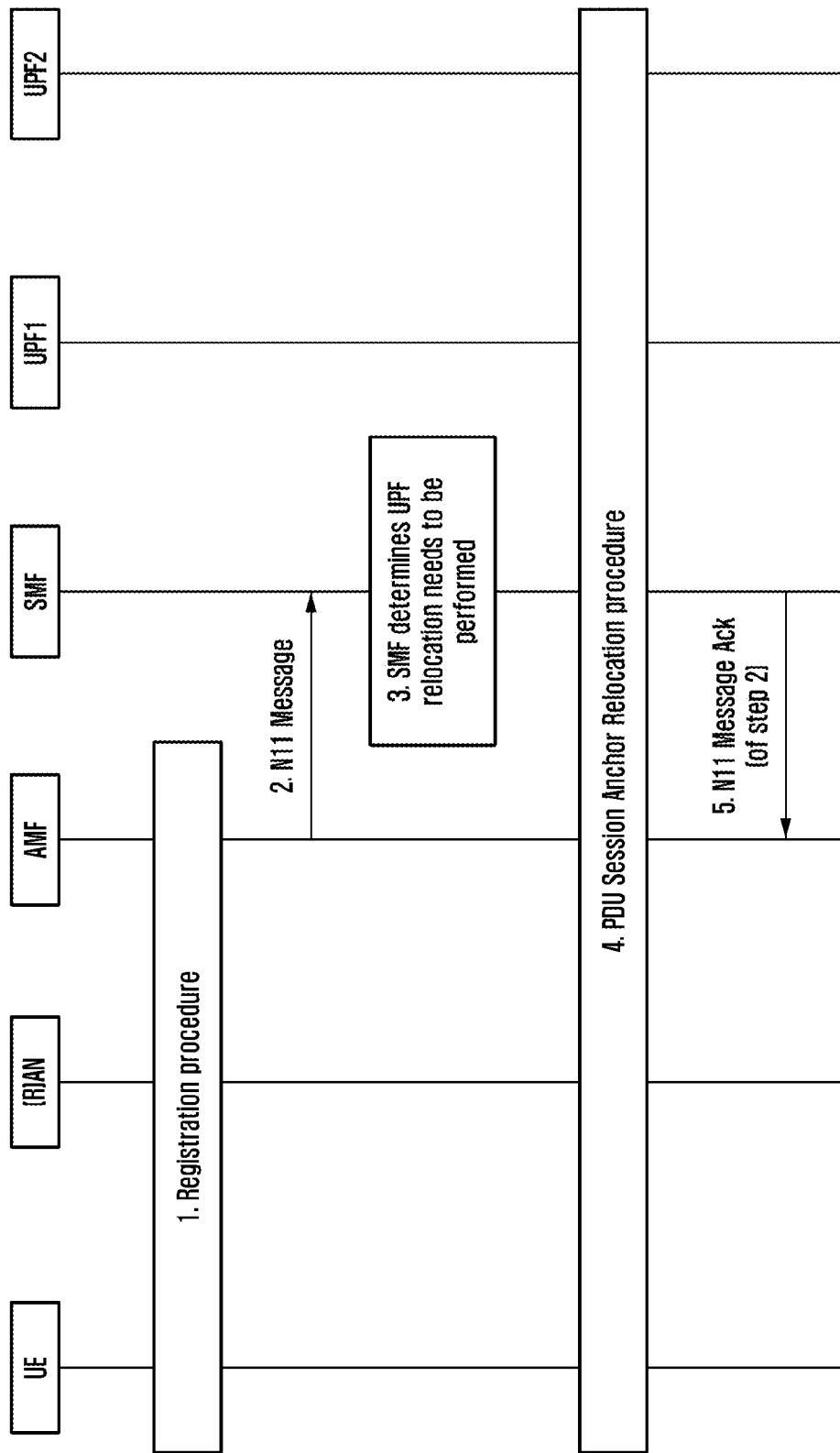
FIG. 10 is a diagram illustrating a procedure of relocating an anchor UPF by an SMF managing a PDU session of an SSC mode 2.

Another embodiment suggests a method in which anchor UPF relocation for a session of an SSC mode 2 is performed when an UE in a CM-IDLE state performs a registration procedure. As illustrated in FIG. 10, the UE performs a basic registration procedure with an AMF (step 1). During the registration procedure or after the registration procedure, when the AMF performs signaling exchange with an SMF, the AMF provides UE location information (TA unit, base station or cell ID, or the like) to the SMF, such that the SMF managing the session of the SSC mode 2 determines whether or not the anchor UPF relocation needs to be performed (step 2). When the SMF determines that the UPF relocation needs to be performed (step 3), the anchor UPF relocation procedure described above is performed (step 4). When the relocation is completed, the SMF may transmit an ACK message to the AMF (step 5). Step 4 may be performed when configuring an UP connection path for actual data transmission.

Figure 11:
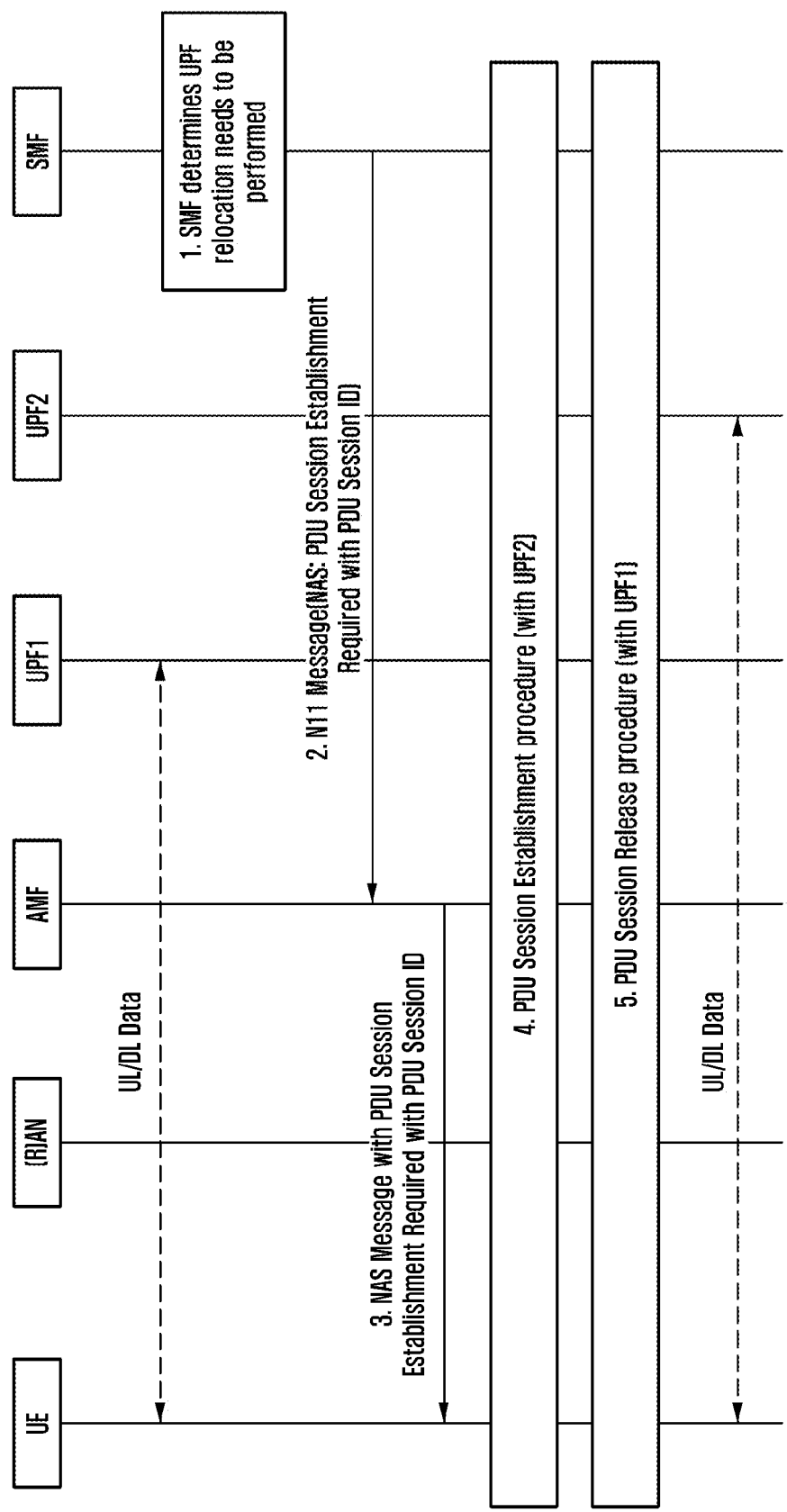
FIG. 11 is a diagram illustrating a procedure of relocating an anchor UPF by an SMF managing a PDU session of an SSC mode 3.

Another embodiment describes a method for performing anchor UPF relocation for a session of an SSC mode 3. Referring to FIG. 11, when an SMF managing the session of the SSC mode 3 determines to perform the anchor UPF relocation for the session (step 1), the SMF transmits, to an AMF, NAS signaling including a PDU session establishment required indicator, a PDU session ID of the session, the remaining lifetime of the session (timer), and the like (step 2). At this time, the SMF transmits an N11 message to the AMF by including an NAS message in the N11 message, and an indicator for routing an NAS message received from the UE may also be included in the N11 message. Whether or not two PDU session IDs are included is checked when a PDU session establishment request is received from the UE, and in a case in which a PDU session ID already managed by the AMF is included, the indicator may allow the request message to be forwarded to an SMF managing the corresponding PDU session. Further, the N11 message transferred from the SMF to the AMF may include the timer value. By doing so, it is possible to set a time for maintaining the indicator for routing the session setup request signaling received by the AMF from the UE to the same SMF. In step 3, the AMF transfers the NAS message received from the SMF to the UE. In step 4, the terminal receiving the NAS signaling starts a PDU session establishment procedure. At this time, the terminal generates a new PDU session ID and transmits NAS signaling including a PDU session establishment request message. The NAS signaling may include the PDU session ID received in step 3. The AMF receiving the NAS signaling checks whether two PDU session IDs are included, and if so, the AMF forwards the NAS signaling to an SMF corresponding to an existing PDU session ID. A subsequent procedure of setting up a session with an UPF2 which is a new UPF through the SMF is the same as described in the above embodiment, thus a detailed description therefor will be omitted. When the session lifetime set in step 2 expires, the SMF performs a PDU session release procedure with the existing UPF (i.e., UPF1). When the UE determines that the PDU session may be released before the session lifetime set in step 2 expires, the UE may also directly start the PDU session release procedure.

Figure 12:
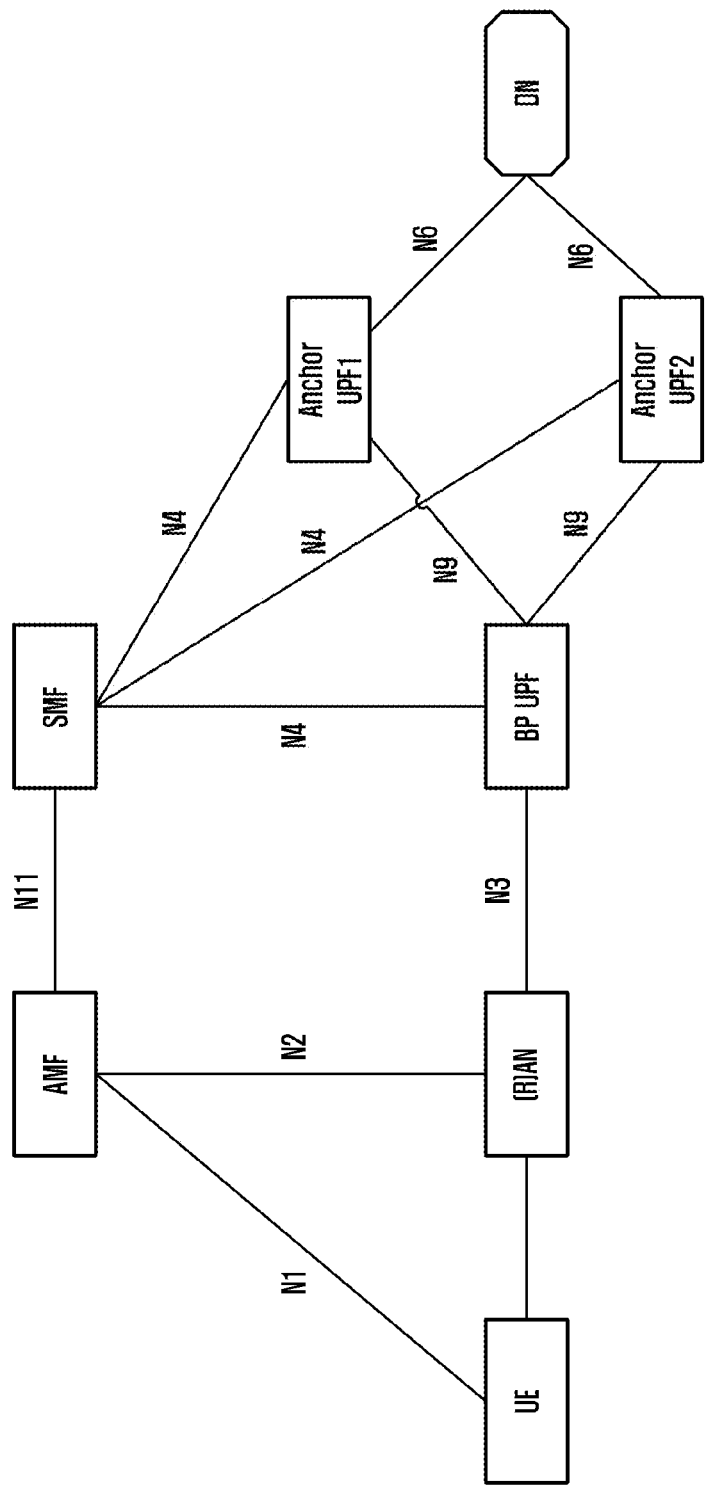
FIG. 12 is a diagram illustrating a network architecture when an anchor UPF is relocated using IPv6 multi-homing by an SMF managing a PDU session of an SSC mode 3.
Figure 13A:
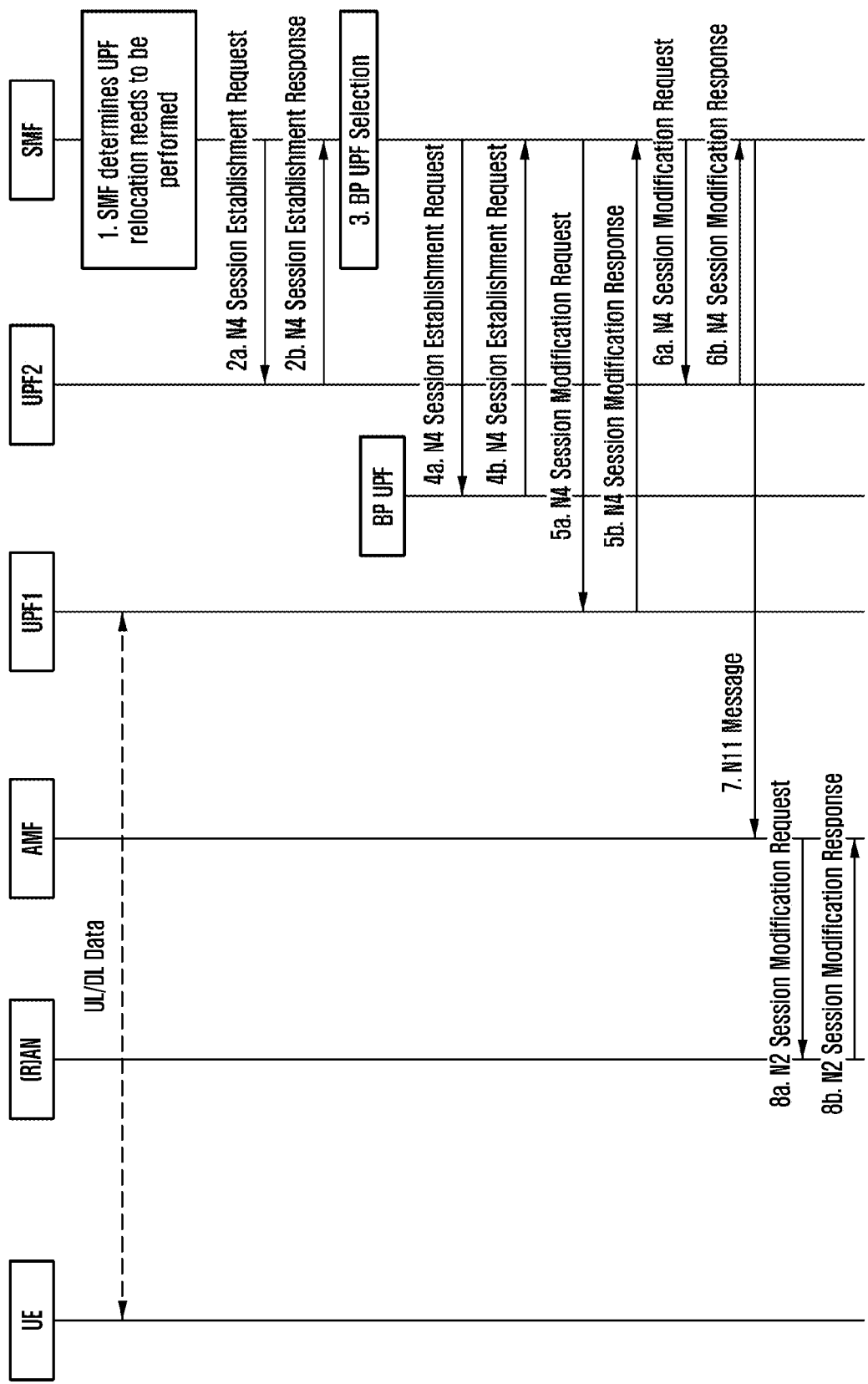
FIGS. 13A and 13B are a diagram illustrating a procedure of relocating an anchor UPF using the IPv6 multi-homing by the SMF managing a PDU session of an SSC mode 3.
Figure 13B:
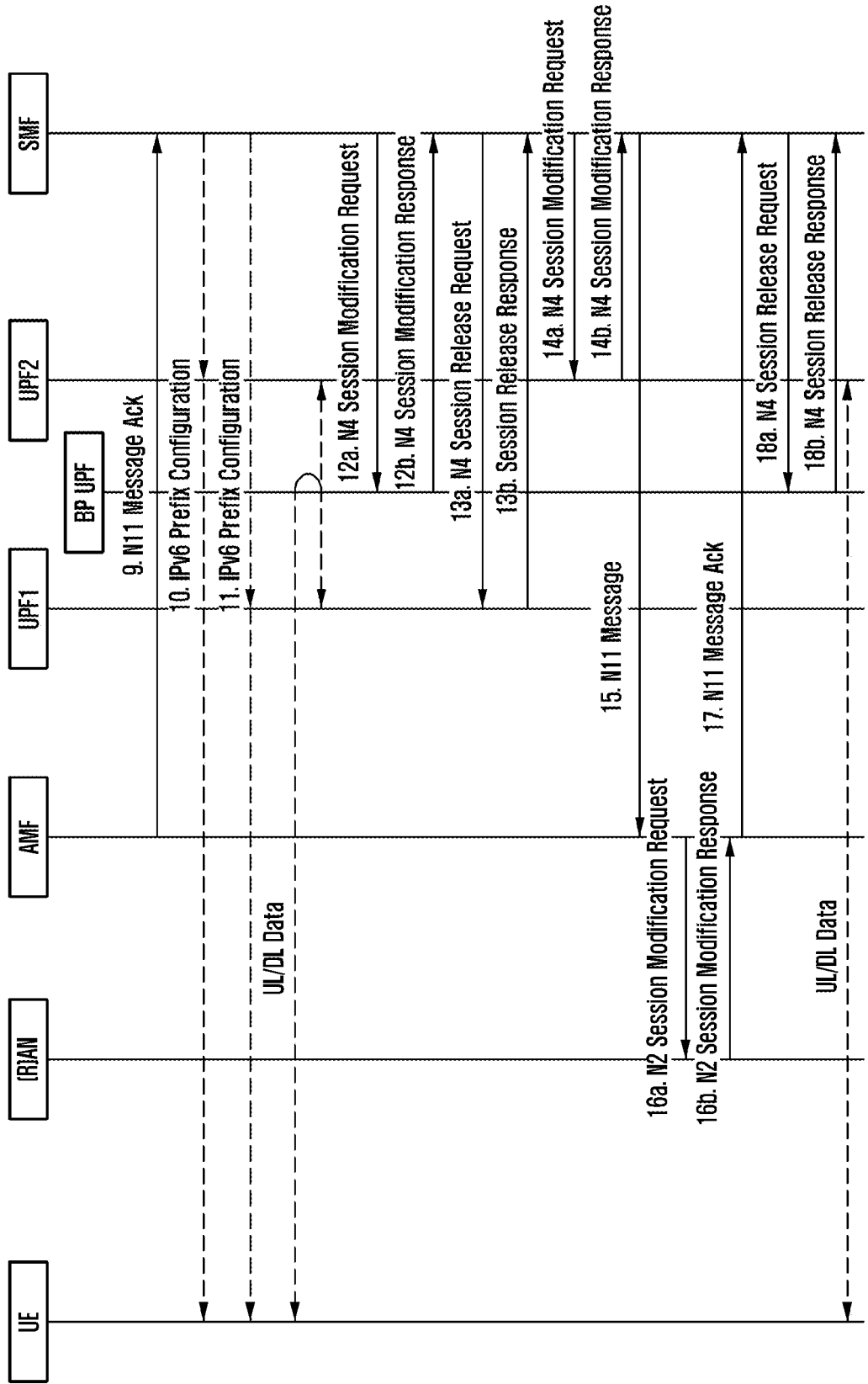

Another embodiment describes a method for performing anchor UPF relocation for a session of an SSC mode 3 which is the IPv6 PDU type. FIG. 12 illustrates a network architecture diagram for describing the present embodiment. Referring to FIGS. 13A and 13B, when an SMF determines to perform anchor UPF relocation for a session of an SSC mode 3 having the IPv6 PDU type, the SMF selects a new anchor UPF, and performs a procedure for setting up an N4 session (steps 1 and 2). In step 3, the SMF additionally selects a branch point UPF (BP UPF) to connect a data transmission channel between an UPF1 which is an existing anchor UPF, an UPF2 which is the new anchor UPF, and an (R)AN, and at the time of selecting the BP UPF, an UPF closer to a location of an UE than the anchor UPF1 and the anchor UPF2 is selected. That is, when selecting the BP UPF, an UPF closer to the UE may be selected in consideration of a location of the anchor UPF. A procedure of setting up an N3 tunnel between the (R)AN and the BP UPF and an N9 tunnel between the BP UPF and the anchor UPFs, that exist between the (R)AN, the BP UPF, the UPF1, and the UPF2 is completed (steps 4 to 9). Then, in step 10, the SMF allocates a new IP prefix of a session that may be routed through the UPF2, and in step 11, a preferred lifetime field for an existing IP prefix routed through the UPF1 is set to be 0, and a valid lifetime field is set to be a lifetime (timer) for maintaining the existing PDU session. When a router advertisement (RA) message including the set option is transferred to the UE, the existing IP prefix is immediately changed to a deprecated state, and becomes invalid after the timer, such that the existing IP prefix may not be used (refer to IETF RFC 4862). The subsequent operation is performed when the timer set by the SMF expires. In step 12, an N4 session modification procedure is performed with the BP UPF for the purpose of blocking traffic transmitted to the existing IP prefix and releasing UP resources for the existing PDU session set up in the BP UPF. Step 13 includes an operation in which the SMF releases a resource of the UPF1 in charge of the existing PDU session. Through steps 14 and 18, the SMF may additionally perform an operation for releasing the BP UPF in order to optimize UP connection of the session for which the UPF relocation is completed.

Figure 14:
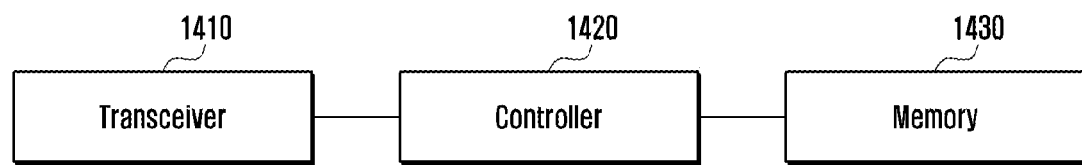
FIG. 14 is a block diagram of the SMF in a network according to an embodiment of the present invention.

FIG. 14 is a block diagram of the SMF in a network according to an embodiment of the present invention.

With reference to FIG. 14, the SMF may include a transceiver 1410, a controller 1420 coupled with the transceiver 1410 and configured to determine whether to change the first UPF to a second UPF, and control the transceiver 1410 to transmit, to a terminal via an access and mobility function (AMF), a first message including a maintain time of the session established via the first UPF, when the first UPF needs to be changed and a memory 1430.

Figure 15:
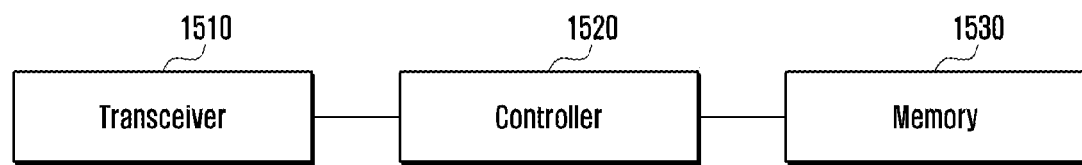
FIG. 15 is a block diagram of the AMF in the network according to an embodiment of the present invention.

FIG. 15 is a block diagram of the AMF in the network according to an embodiment of the present invention.

With reference to FIG. 15, the AMF may include a transceiver 1510, a controller 1520 coupled with the transceiver 1510 and configured to control the transceiver 1510 to receive, from a session management function (SMF), a first message including a maintain time of the session established via the first UPF, when the first UPF needs to be changed, and control the transceiver 1510 to forward, to a terminal, the first message, and a memory 1530.

Figure 16:
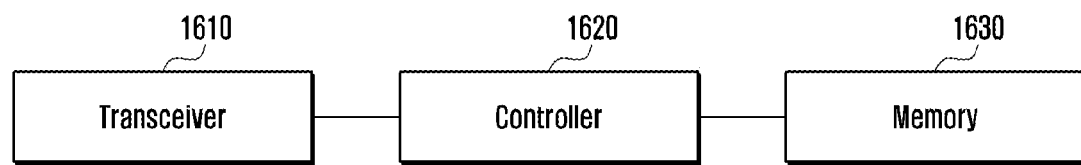
FIG. 16 is a block diagram of the terminal in a network according to an embodiment of the present invention.

FIG. 16 is a block diagram of the terminal in a network according to an embodiment of the present invention.

With reference to FIG. 16, the terminal may include a transceiver 1610, a controller 1620 coupled with the transceiver 1610 and configured to control the transceiver 1610 to receive, from a session management function (SMF) via an access and mobility management function (AMF), a first message including a maintain time of the session established via the first UPF, when the first UPF needs to be changed, decide to initiate a procedure to establish a session using the second UPF, and control the transceiver 1610 to transmit, to the AMF, a second message including protocol data unit (PDU) session identification (ID) of a session, established via the second UPF.

The present disclosure defines parameters required for UPF relocation between the network entities configuring the 5G system, and suggests the detailed relocation procedure including the definition, such that a time required for UPR relocation is shortened by reusing previously allocated session resources, thereby improving quality of experience (QoE) of users.

The embodiments of the present disclosure disclosed in the present specification and the accompanying drawings have been provided merely as specific examples in order to assist in understanding of the present disclosure and do not limit the scope of the present disclosure. It is obvious to those skilled in the art to which the present disclosure pertains that various modifications may be made without departing from the scope of the present disclosure. Further, the respective embodiments may be combined and operated as needed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a session management function (SMF) in a communication system, the method comprising:

determining whether to change a first user plane function (UPF) associated with a first protocol data unit (PDU) session of a terminal, the first PDU session being associated with a session and service continuity (SSC) mode 3;
in case that the first UPF needs to be changed, transmitting, to an access and mobility management function (AMF), a first message including an identity (ID) of the first PDU session, a lifetime value for maintaining the first PDU session, and information indicating a PDU session establishment being required; and
receiving, from the AMF, a second message for establishing a second PDU session of the terminal, based on the information, the second message including the ID of the first PDU session and an ID of the second PDU session, and
wherein the second PDU session associated with a second UPF is established based on the ID of the second PDU session.

2. The method of claim 1, wherein the first PDU session is released by the terminal before a timer associated with the lifetime value expires.

3. The method of claim 1, further comprising:
receiving, from the AMF, a third message for releasing the first PDU session before a timer associated with the lifetime value expires.

4. The method of claim 1, wherein the ID of the second PDU session is generated by the terminal.

5. The method of claim 1, wherein the first PDU session is released by the SMF in case that a timer associated with the lifetime value expires.

6. A method performed by an access and mobility management function (AMF) in a communication system, the method comprising:
receiving, from a session management function (SMF), a first message including an identity (ID) of a first protocol data unit (PDU) session of a terminal, a lifetime value for maintaining the first PDU session associated with a first user plane function (UPF), and information indicating a PDU session establishment being required, the first PDU session being associated with a session and service continuity (SSC) mode 3;
transmitting, to a terminal, the first message;
receiving, from the terminal, a second message for establishing a second PDU session of the terminal, based on the first message, the second message including the ID of the first PDU session and an ID of the second PDU session;
identifying the SMF based on the ID of the first PDU session included in the second message; and
transmitting, to the identified SMF, a third message based on the second message,
wherein the second PDU session associated with a second UPF is established based on the ID of the second PDU session.

7. The method of claim 6, wherein the first PDU session is released by the terminal, before a timer associated with the lifetime value expires.

8. The method of claim 7, wherein the first PDU session is released by the SMF, in case that a timer associated with the lifetime value expires.

9. The method of claim 6, further comprising:
receiving, from the terminal, a fourth message for releasing the first PDU session before a timer associated with the lifetime value expires.

10. The method of claim 6, wherein the ID of the second PDU session is generated by the terminal.

11. A method performed by a terminal in a communication system, the method comprising:
receiving, from an access and mobility management function (AMF), a first message including an identity (ID) of a first protocol data unit (PDU) session, a lifetime value for maintaining the first PDU session associated with a first user plane function (UPF), and information indicating a PDU session establishment being required, the first PDU session being associated with a session and service continuity (SSC) mode 3;
determining to initiate a procedure to establish a second PDU session based on the information; and
transmitting, to the AMF, a second message for establishing the second PDU session, the second message including the ID of the first PDU session and an ID of the second PDU session,
wherein the second PDU session is established based on the ID of the second PDU session.

12. The method of claim 11, wherein the first PDU session is released by the terminal before a timer associated with the lifetime value expires.

13. The method of claim 11, further comprising:
transmitting, to the AMF, a third message for releasing the first PDU session before a timer associated with the lifetime value expires.

14. The method of claim 13, wherein the first PDU session is released by a session management function (SMF), in case that a timer associated with the lifetime value expires.

15. The method of claim 11, further comprising:
generating the ID of the second PDU session.

16. A session management function (SMF) in a communication system, the SMF comprising:
a transceiver; and
a controller configured to:
determine whether to change a first user plane function (UPF) associated with a first protocol data unit (PDU) session of a terminal, the first PDU session being associated with a session and service continuity (SSC) mode 3,
in case that the first UPF needs to be changed, transmit, to an access and mobility management function (AMF) via the transceiver, a first message including an identity (ID) of the first PDU session, a lifetime value for maintaining the first PDU session, and information indicating a PDU session establishment being required, and
receive, from the AMF via the transceiver, a second message for establishing a second PDU session of the terminal, based on the information, the second message including the ID of the first PDU session and an ID of the second PDU session,
wherein the second PDU session associated with a second UPF is established based on the ID of the second PDU session.

17. The SMF of claim 16, wherein the first PDU session is released by the terminal before a timer associated with the lifetime value expires.

18. The SMF of claim 16, wherein the controller is further configured to receive, from the AMF via the transceiver, a third message for releasing the first PDU session before a timer associated with the lifetime value expires.

19. The SMF of claim 16, wherein the ID of the second PDU session is generated by the terminal.

20. The SMF of claim 16, wherein the first PDU session is released by the SMF in case that a timer associated with the lifetime value expires.

21. An access and mobility management function (AMF) in a communication system, the AMF comprising:
a transceiver; and
a controller configured to:
receive, from a session management function (SMF) via the transceiver, a first message including an identity (ID) of a first protocol data unit (PDU) session of a terminal, a lifetime value for maintaining the first PDU session associated with a first user plane function (UPF), and information indicating a PDU session establishment being required, the first PDU session being associated with a session and service continuity (SSC) mode 3,
transmit, to a terminal via the transceiver, the first message,
receive, from the terminal via the transceiver, a second message for establishing a second PDU session of the terminal, based on the first message, the second message including the ID of the first PDU session and an ID of the second PDU session,
identify the SMF based on the ID of the first PDU session included in the second message, and
transmit, to the identified SMF via the transceiver, a third message based on the second message,
wherein the second PDU session associated with a second UPF is established based on the ID of the second PDU session.

22. The AMF of claim 21, wherein the first PDU session is released by the terminal, before a timer associated with the lifetime value expires.

23. The AMF of claim 21, wherein the controller is further configured to receive, from the terminal via the transceiver, a fourth message for releasing the first PDU session before a timer associated with the lifetime value expires.

24. The AMF of claim 21, wherein the ID of the second PDU session is generated by the terminal.

25. The AMF of claim 21, wherein the first PDU session is released by the SMF, in case that a timer associated with the lifetime value expires.

26. A terminal in a communication system, the terminal comprising:
a transceiver; and
a controller configured to:
receive, from an access and mobility management function (AMF) via the transceiver, a first message including an identity (ID) of a first protocol data unit (PDU) session, a lifetime value for maintaining the first PDU session associated with a first user plane function (UPF), and information indicating a PDU session establishment being required, the first PDU session being associated with a session and service continuity (SSC) mode 3,
determine to initiate a procedure to establish a second PDU session based on the information, and
transmit, to the AMF via the transceiver, a second message for establishing the second PDU session, the second message including the ID of the first PDU session and an ID of the second PDU session,
wherein the second PDU session is established based on the ID of the second PDU session.

27. The terminal of claim 26, wherein the controller is further configured to release first PDU session, before a timer associated with the lifetime value expires.

28. The terminal of claim 26, wherein the controller is further configured to transmit, to the AMF via the transceiver, a third message for releasing the first PDU session before a timer associated with the lifetime value expires.

29. The terminal of claim 26, wherein the controller is further configured to generate the ID of the second PDU session.

30. The terminal of claim 26, wherein the first PDU session is released by a session management function (SMF), in case that a timer associated with the lifetime value expires.

* * * * *